Patented June 11, 1929.

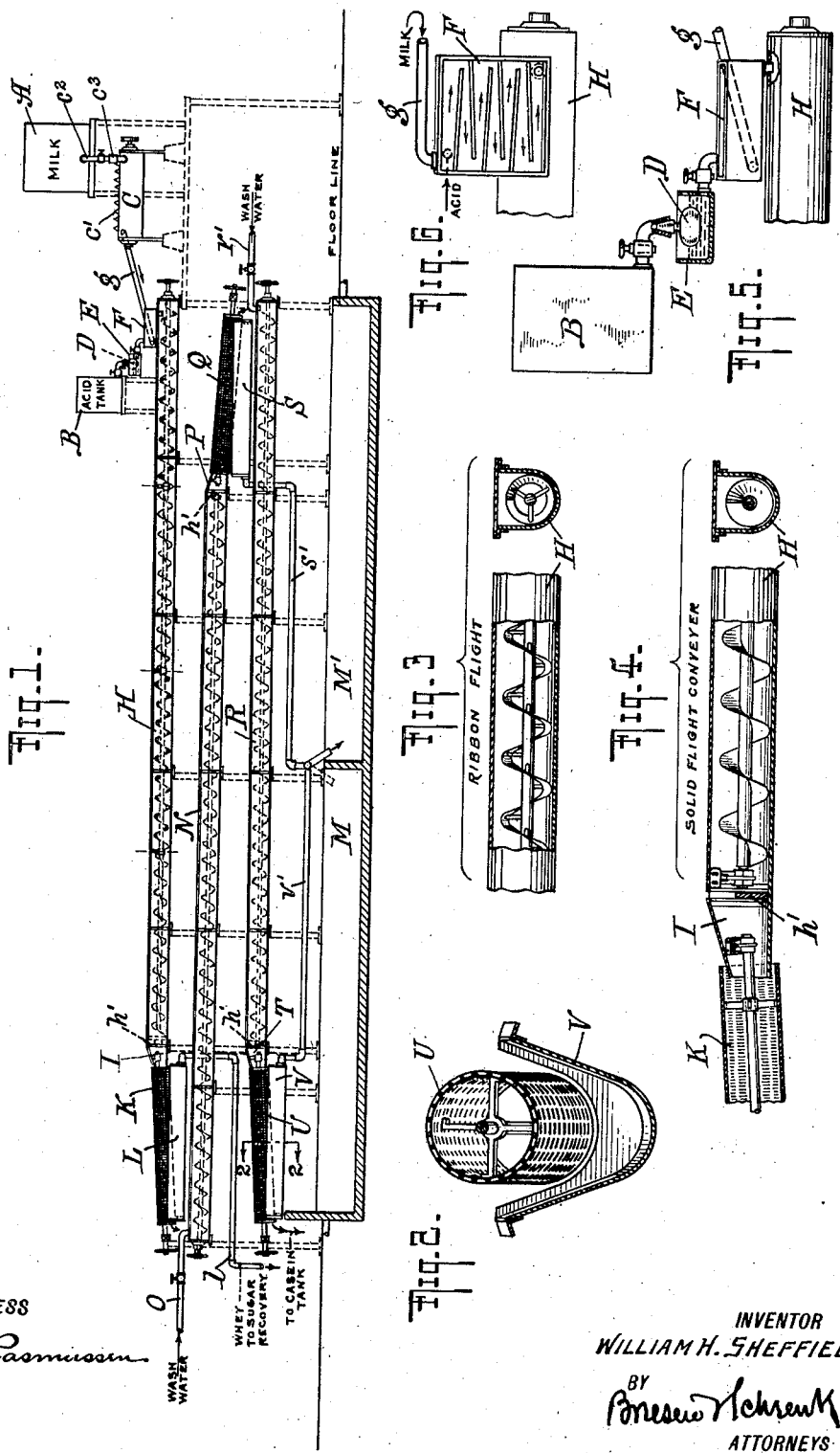

1,716,799

UNITED STATES PATENT OFFICE.

WILLIAM H. SHEFFIELD, OF HOBART, NEW YORK.

PROCESS FOR THE MANUFACTURE OF CASEIN.

Application filed August 21, 1925. Serial No. 51,708.

My invention relates to a process for the preparation of acid precipitated casein and has for its special object the production of a casein of this type which is substantially as good, that is to say, is available for many manufacturing purposes, as self-soured (natural) casein particularly for use in coating paper which has blanc fixe or certain other fillers incorporated therewith. I have found that by reducing the normally high ash content of acid casein to the proportion of ash content in self-soured casein, or lower, I am enabled to use acid casein for many purposes for which heretofore only self-soured casein could be used.

In carrying out my invention I add the acid to the skim milk, preferably in a continuous manner, the milk being heated to such a temperature, and the proportion of acid (preferably muriatic) being such that the resulting curd tends to form relatively small granules, know to the art as grain curd, but not so small as to incur the danger of losing the curd by its passing through the strainers hereinafter described. The necessary temperature and acid proportion for producing grain curd are well known to those skilled in the art. I mix the milk and acid thoroughly, keeping them agitated preferably up to the moment at which I separate the casein from the whey, conducting the agitation in such a manner that not only the acid and milk are mixed as thoroughly as possible, but that the resulting curd is divided into small particles, or kept from agglomerating into large particles. Up to the time of separation of whey and curd I do not add water, nor do I apply heat (except that the milk has been preheated, as hereinabove stated), but I do subject the separated casein to a very thorough washing or to several washings, preferably in a continuous manner. I am aware of the fact that acid preciptated curd has heretofore been thoroughly washed with water but such washing removed only a comparatively small proportion of the ash content, unless possibly the washing was continued to a commercially impracticable extent. However, by my method most, if not all, of said ash content of the reaction products as is held in solution or in suspension in the whey is removed before it has an opportunity to be occluded in the casein and the casein is broken up into particles of comparatively small size, or kept from agglomerating into large particles, and therefore more readily accessible to the subsequent washing treatment.

In the drawing accompanying this application, which illustrates one form of an apparatus suitable for carrying out my process, Fig. 1 is a side elevation partly in section of one form of a complete apparatus, drawn to scale, embodying my invention and for carrying out the process hereinabove described; Fig. 2 is an enlarged cross-sectional detail on the line 2—2 of Fig. 1; Fig. 3 is a detail view, side and cross-sectional, of a portion of a ribbon flight forming part of the mixing conveyer shown in Fig. 1; Fig. 4 is a detail view, side and cross-sectional, of a portion of the solid flight forming part of the mixing conveyer shown in Fig. 1; Fig. 5 is an enlarged elevation of the acid tank, float tank and mixing box shown in Fig. 1, and Fig. 6 is an enlarged detail plan view of the mixing box shown in Fig. 1.

A is a milk storage tank and B an acid storage tank. C is a milk heater of a well known type now on the market, in which the heat is conveyed to the milk by hollow copper disks indicated by $c'$. As any suitable milk heater may be used no further details of the milk heater are shown in the drawing. The milk heater is fed from the milk storage tank through pipe $c^2$ which may, and preferably is, provided with a flow control indicated, but not illustrated, by $c^3$. D is a float flow controller for keeping constant the flow of acid from tank B to intermediate tank E from which the acid flows into a baffled mixing box F where it is mixed with the milk flowing from C through a pipe $g$. From the mixing box F the mixed milk and acid pass in a continuous manner into a screw conveyer H of any suitable construction. I prefer, however, to have alternate sections of this conveyer, for instance, in the apparatus illustrated, the first and third quarter, of the conveyer flight, in the form of a helicoid ribbon as indicated in Fig. 3, the remaining sections being solid as shown in Fig. 4. The helicoid ribbon apparently produces a better mixing than the solid portion of the screw conveyer, while the solid portion acts not only as a positive forward feeder but also as a retarder to prevent too fast a forward movement of the curd and whey. In order that the screw conveyer H may be self-draining, it is slightly slanted downwardly in the direction of feed, but, to prevent the liquid matter from leaving the conveyer ahead of the solid matter, each conveyer is provided with a suitable, preferably interchangeable, gate, such as h', Fig. 4.

Through a suitable spout I the contents of the screw conveyer H discharge in a continuous manner into a cylindrical screen or strainer K rotatably mounted on suitable bearings and preferably tilted downwardly in the direction of feed. The whey passes through the screen into a receptacle L from which it flows through pipe l to the usual sugar recovery tank (not shown). The curds drop into a second screw conveyer N provided with a suitable flight, for instance, like the one in conveyer H, where they are mixed with water flowing through pipe O, and are fed through a spout P into screen Q, and from there into a third screw conveyer R, similar to conveyers H and N, the wash water dropping into a receptacle S and passing therefrom through pipe s' into one of the settling tanks M, M'. After passing through conveyer R where they are further washed by water entering through pipe r', the curds pass through spout T, and strainer U into a suitable receptacle (not shown), the wash water passing into receptacle V and thence through pipe v' into one of the settling tanks M, M'. Spouts P, T, screens Q, U, and receptacles S, V, are like, and perform the same functions as, spout I, screen K and receptacle L, respectively, and conveyer R performs the same function as conveyer N.

All the parts of the apparatus are, of course, suitably supported but for the sake of clearness no showing has been made of some of such supports.

The drawing shows the apparatus with all the conveyers and screens shown in proportion, and drawn to scale, the total length of the mixing conveyer H proper not including the spout I being approximately 49½ feet. I am, of course, not restricted to the use of an apparatus of these proportions or even of this kind but so far as I am at present devised I believe that it illustrates the most efficient form. The length of the screw conveyers H, N and R, respectively, should be sufficient to permit a thorough mixing of, and reaction between, the milk and acid, and a thorough washing of the curds, respectively.

As already stated, in order to obtain a casein having as low an ash content as practically possible, it is highly advisable to preheat the milk to such a temperature and to use such a proportion of acid that the resulting curd tends to form relatively small granules known to the art as grain curd. Care should be taken not to precipitate the casein, or any substantial proportion thereof, in such fine particles that they are able to pass through the screens, as this would mean either a total loss of such particles or the necessity of recovering such casein from the whey or wash water. Those skilled in the art of manufacturing casein are familiar with conditions under which grain curd is produced. However, to give a specific example, I heat the milk in tank A to about 110° F. and supply to the milk in the mixing box F an amount of acid sufficient to produce an acidity of the whey equivalent to the acidity which it would have if it contained one-half per cent of lactic acid. I prefer to use muriatic acid 20° Bé. diluted one-half, and I so proportion the acid to the volume of milk passing through the mixing box F that a sample of whey taken from the conveyer H about midway between its ends tests ½ of 1% on a lactic acid basis. As, however, milk shows great variations in regard to quality, particularly acidity, I make frequent tests for whey acidity, preferably about every twenty minutes, and increase or diminish the flow of acid into the mixing box according to results shown. It may possibly be advisable at times to heat the milk to a somewhat higher or somewhat lower temperature than that indicated, but this is a matter which the casein chemist fully understands.

In an apparatus having conveyers of the proportion of those shown in the drawing, I so regulate the speed of the flight in conveyer H that the acid and milk, or curd and whey respectively, pass from one end of such conveyer to the other in from three to five minutes and from end to end in conveyers N and R in about eighteen to twenty minutes each. The speed of rotation of the screens K, Q, and U is such that the casein passes therethrough from end to end in about six minutes each so that the material passes through the three conveyers and three screens in approximately one hour.

I may, under certain circumstances, heat the wash water to 75° F. and/or slightly acidulate it in order to increase the solvent action of the water upon the ash in the material passing through conveyors N and R, although in that case I prefer to acidulate only the water passing into conveyer N so that the acid may again be washed out in conveyer R.

The milk and acid are mixed during their passage between the baffles in the mixing box F, but the complete separation of whey and casein begins only in the conveyer H. In an apparatus proportioned and operated as shown and described, the reaction between acid and milk is substantially complete when the material has travelled about one-half the length of the conveyer. It will be noted that the reaction takes place while the material is being constantly agitated in the conveyer H and that after the reaction is complete the reaction products are continuously agitated up to the moment in which the whey passes through the orifices in screen K. There is thus produced not only a very thorough mixing of acid and milk during the reaction but also a subdivision of the curd into small granules, thus maintaining a condition in which very little soluble ash is occluded and in which the major portion of the insoluble ash is made accessible to the solvent action of the acid whey. The whey being promptly removed and the curd, therefore, not being permitted to settle in the whey, the danger of occluding ash by settling is obviated. The grain curd being in the form of relatively small granules is more readily accessible to the solvent and other cleansing action of the wash water in conveyers N and R. I thus obtain a large reduction of ash content. Thus, tests made with an apparatus operated as hereinabove described and comprising conveyers of the number and proportion disclosed, resulted in an average ash content of the casein (dry) as it passed out of conveyer H, of 3.59%. Under the same conditions the proportion of ash content of the casein passing out of conveyer N was 2.68%, and out of conveyer R 2.21%. The resulting casein is thin flowing and does not jell. By the removal of so large a proportion of the ash, the size or glue produced by customary solvents is increased in strength from 25% to 30%. By my process the proportion of butter fat, milk sugar and acid residues are also reduced to a minimum.

I claim:

1. The improvement in the process of manufacturing acid precipitated casein which consists in adding acid to milk, agitating the mixture until the reaction is completed and then separating the whey from the curd immediately after the agitation ceases, thus preventing the curd from settling in the whey.

2. The improvement in the process of manufacturing acid precipitated casein which consists in adding acid to milk under conditions which will cause the curd to form as grain curd, agitating the mixture until the reaction is completed and then separating the whey from the curd immediately after the agitation ceases, thus preventing the curd from settling in the whey.

3. The improvement in the process of manufacturing acid precipitated casein which consists in adding acid to milk, agitating the mixture until the reaction is completed, separating the whey from the curd immediately after the agitation ceases, thus preventing the curd from settling in the whey, adding water to the curd, agitating the curd in the water and then separating the water from the curd.

4. The improvement in the process of manufacturing acid precipitated casein which consists in adding acid to milk under conditions which will cause the curd to form as grain curd, agitating the mixture until the reaction is completed, separating the whey from the curd immediately after the agitation ceases, thus preventing the curd from settling in the whey, adding water to the curd, agitating the curd in the water and then separating the water from the curd.

5. The improvement in the process of manufacturing acid precipitated casein which consists in adding acid to milk under conditions which will cause the curd to form as grain curd, agitating the mixture while conducting it over a confined path of predetermined length sufficient to permit the reaction to be completed, and then separating the whey from the curd immediately after the agitation ceases so as to prevent the curd from settling in the whey.

6. The improvement in the process of manufacturing acid precipitated casein which consists in adding acid to milk under conditions which will cause the curd to form as grain curd, agitating the mixture while conducting it over a confined path of predetermined length sufficient to permit the reaction to be completed, separating the whey from the curd immediately after the agitation ceases so as to prevent the curd from settling in the whey, adding water to the curd, agitating the curd in the water while conducting both over a confined path of predetermined length sufficient to permit the curd to be washed to the desired extent and then separating the water from the curd.

WILLIAM H. SHEFFIELD.